Feb. 24, 1953   J. C. OLSEN ET AL   2,629,233
FOOD FREEZING APPARATUS
Filed Feb. 24, 1948   13 Sheets-Sheet 10
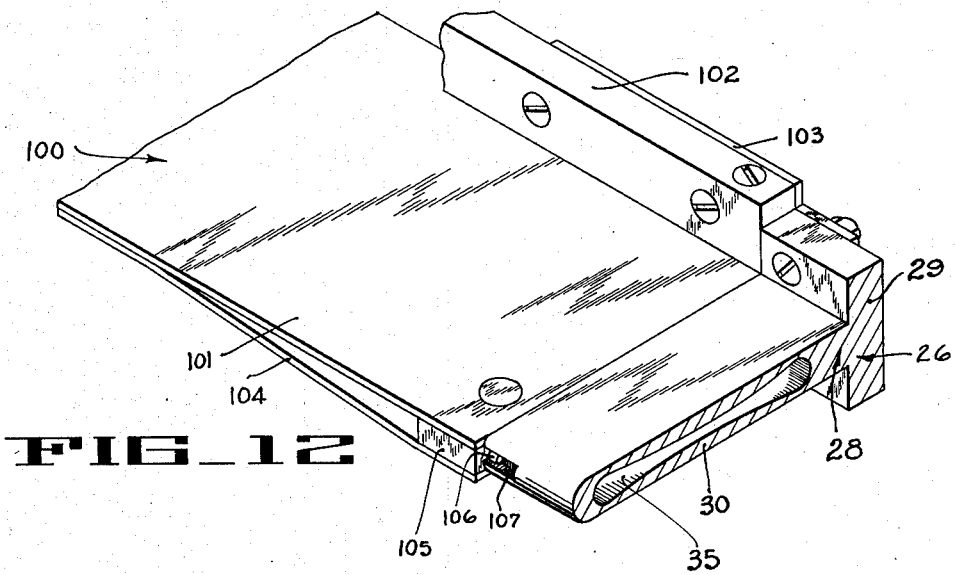
FIG_12
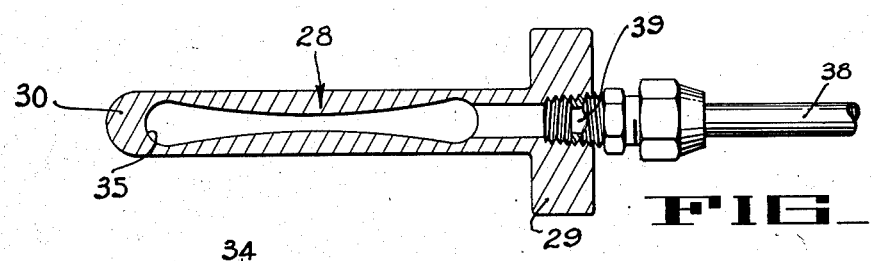
FIG_13
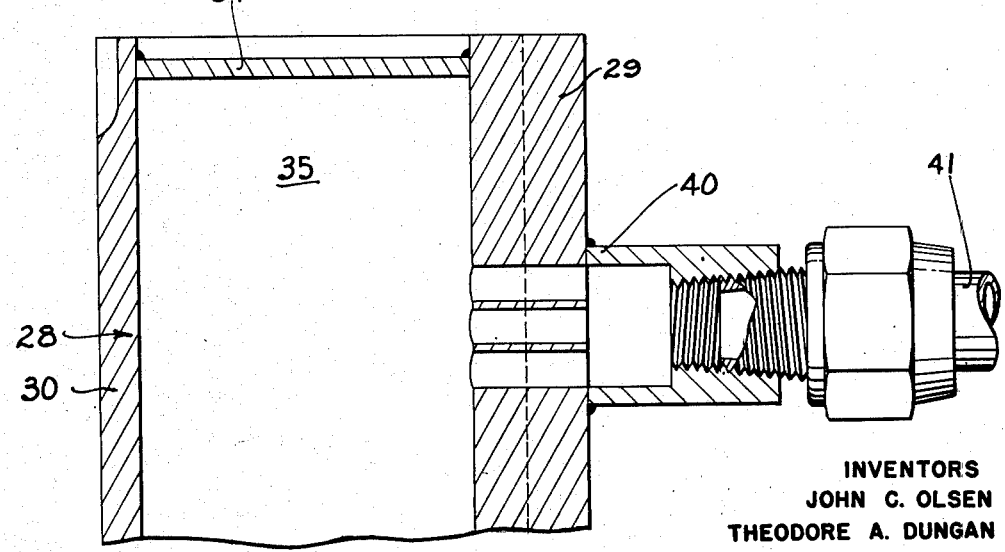
FIG_14
INVENTORS
JOHN C. OLSEN
THEODORE A. DUNGAN
BY *Philip A. Minnis*
*Hans G. Hoffmeister*
ATTORNEYS

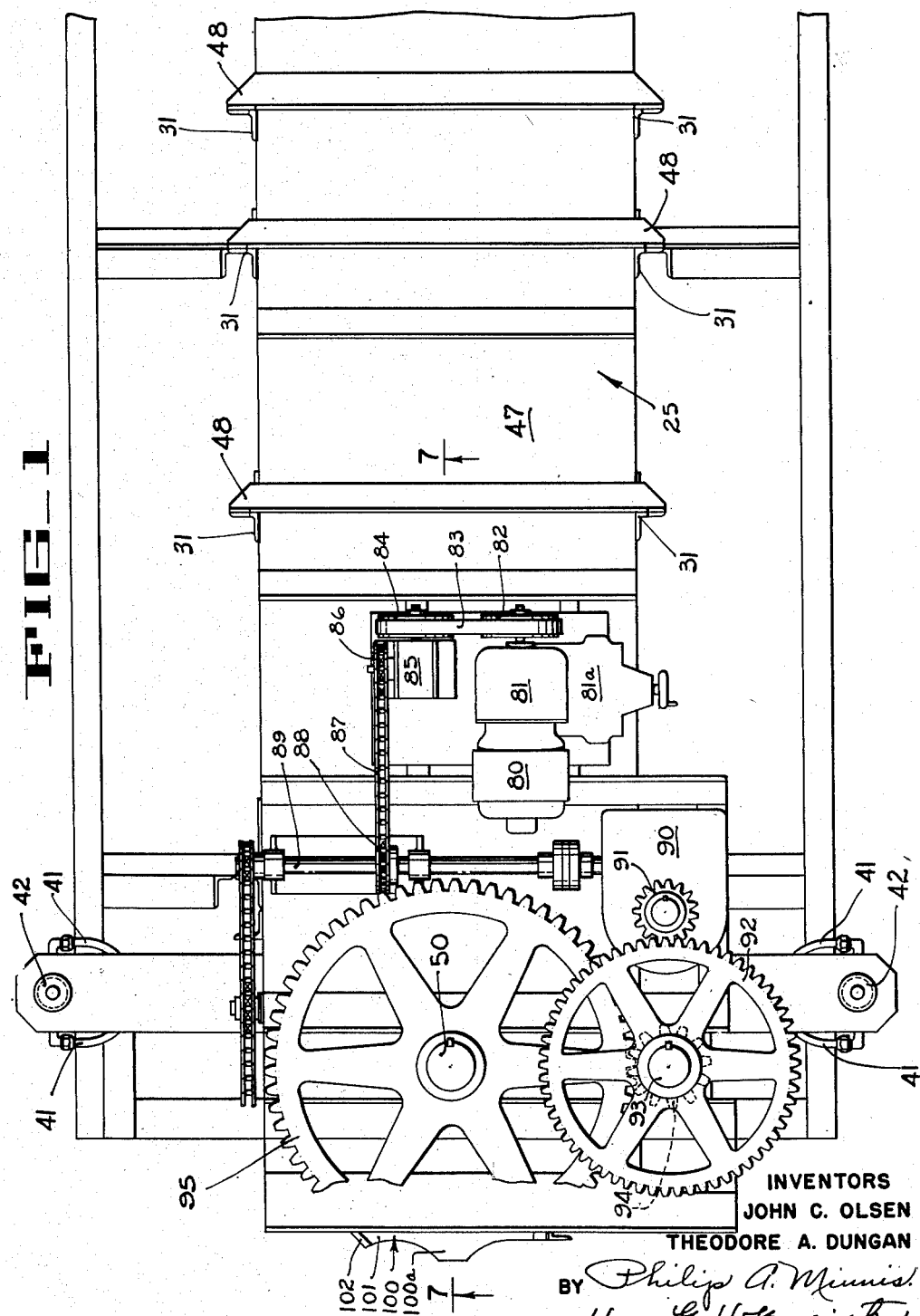

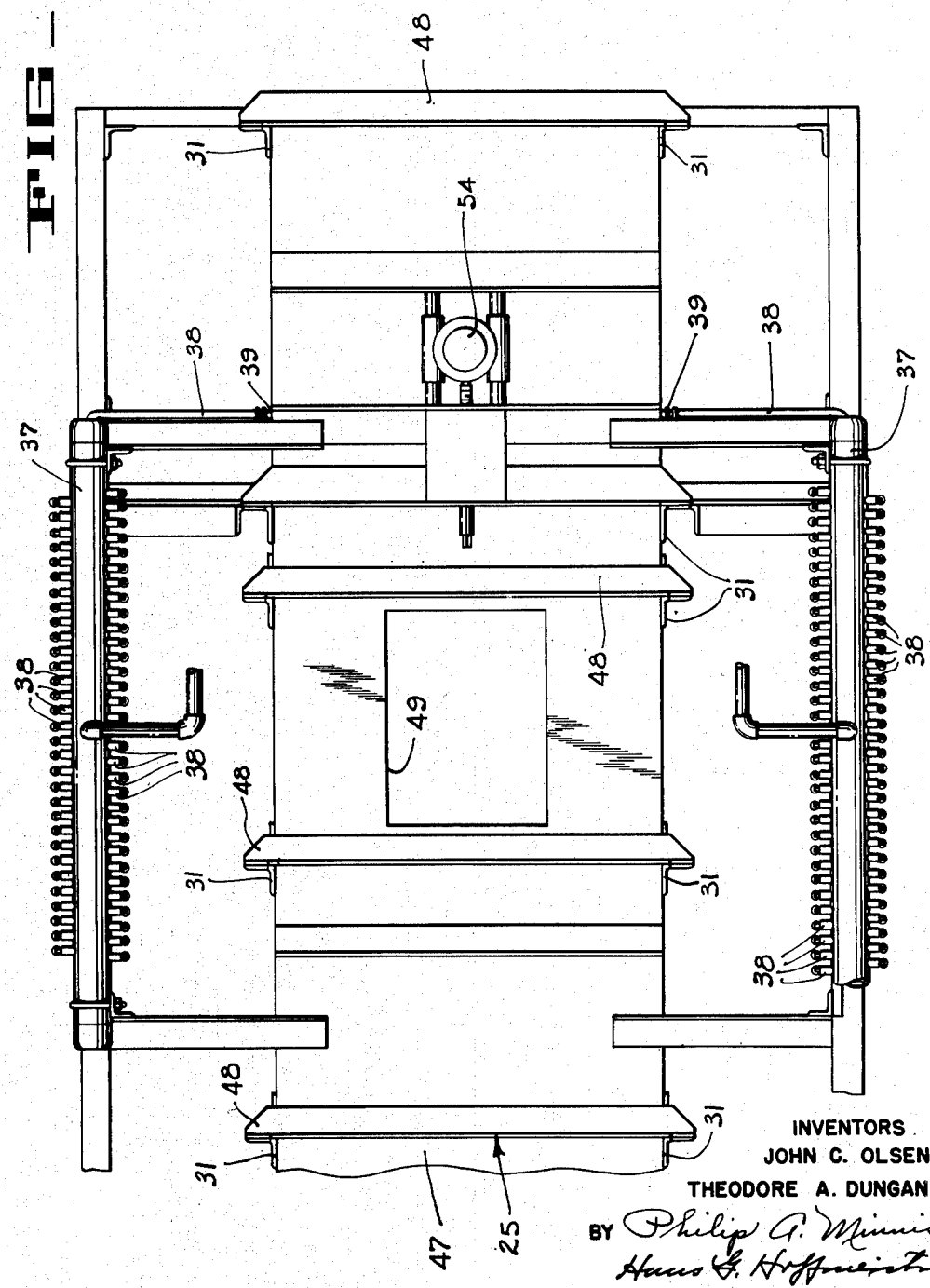

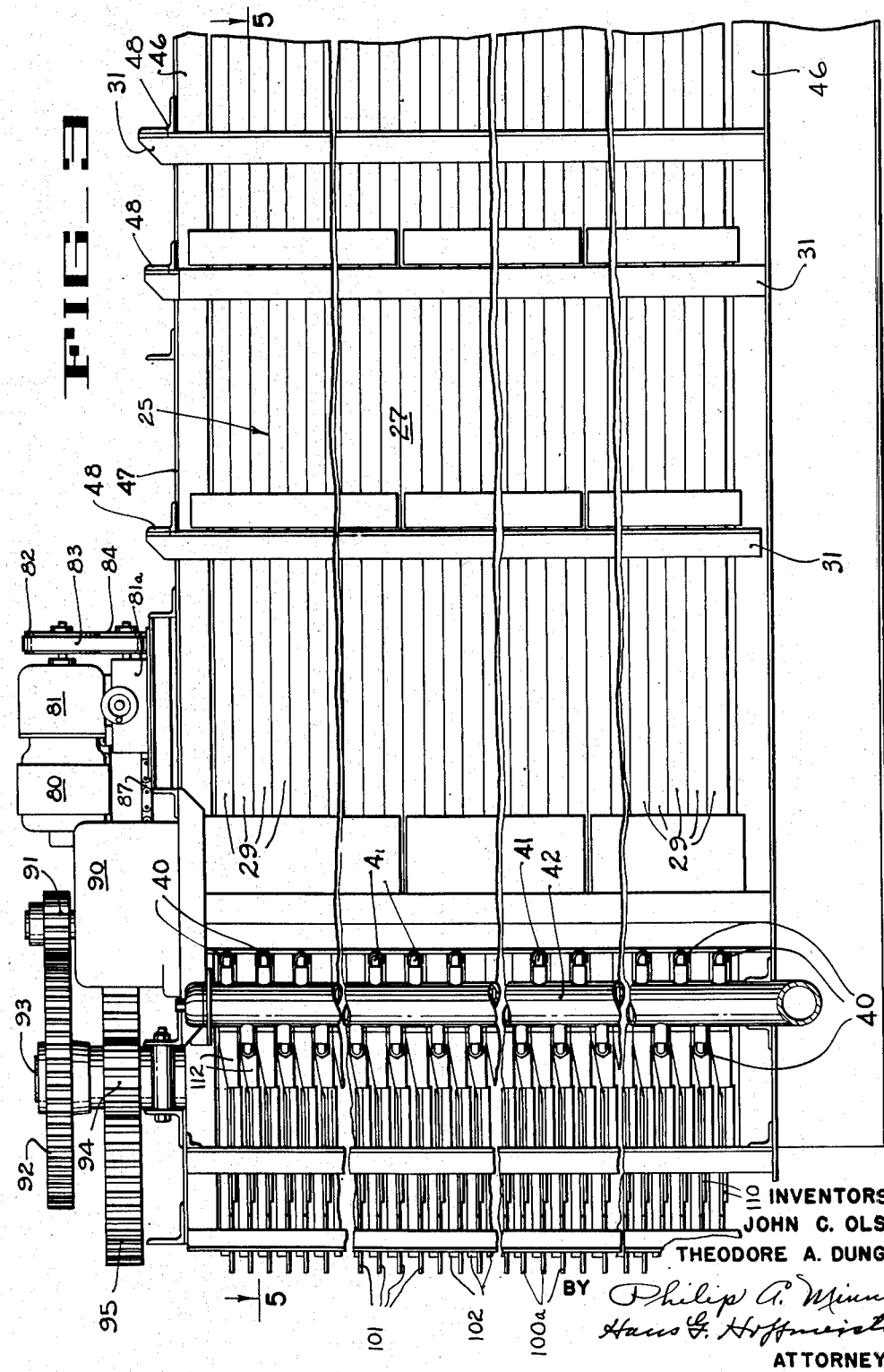

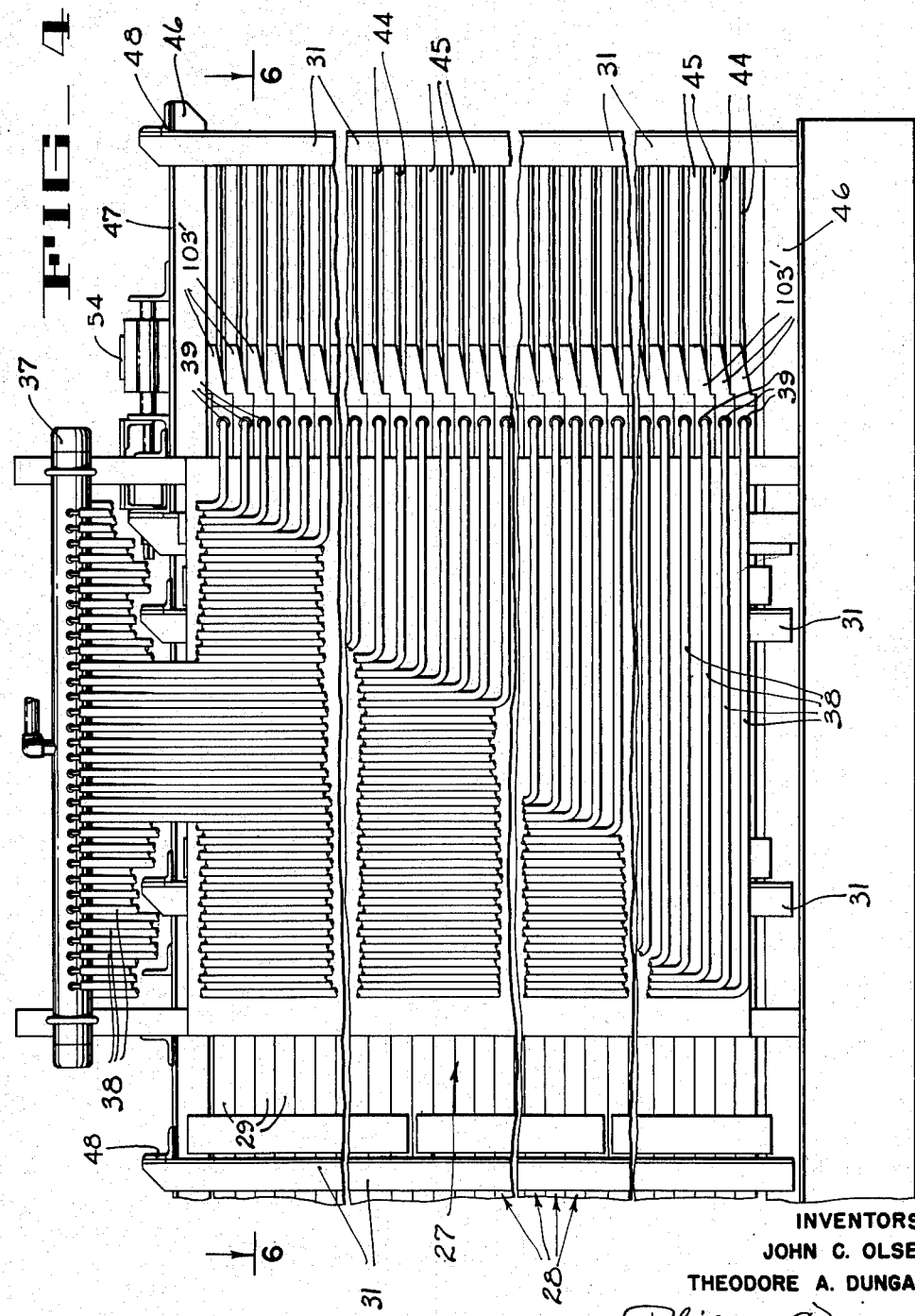

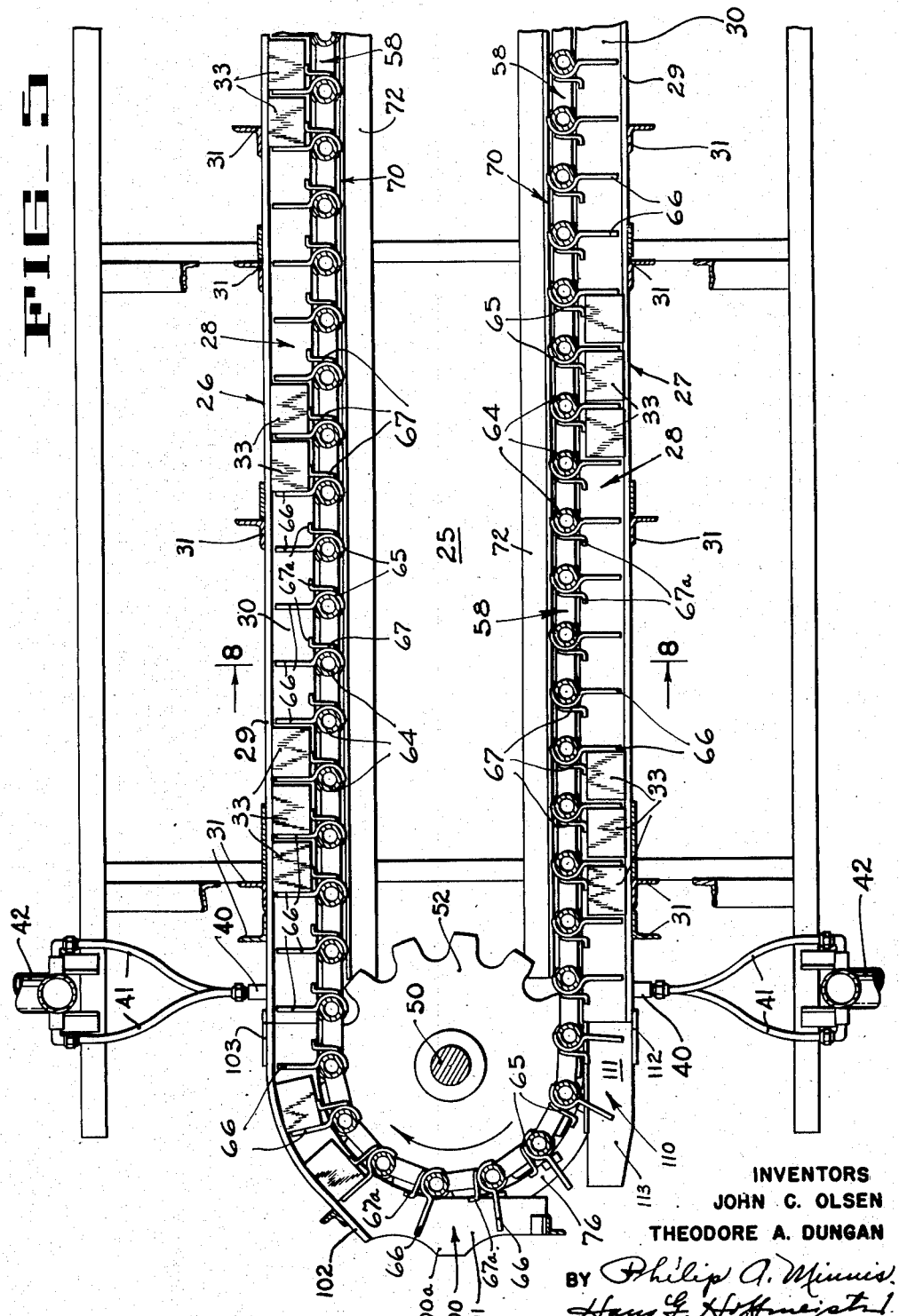

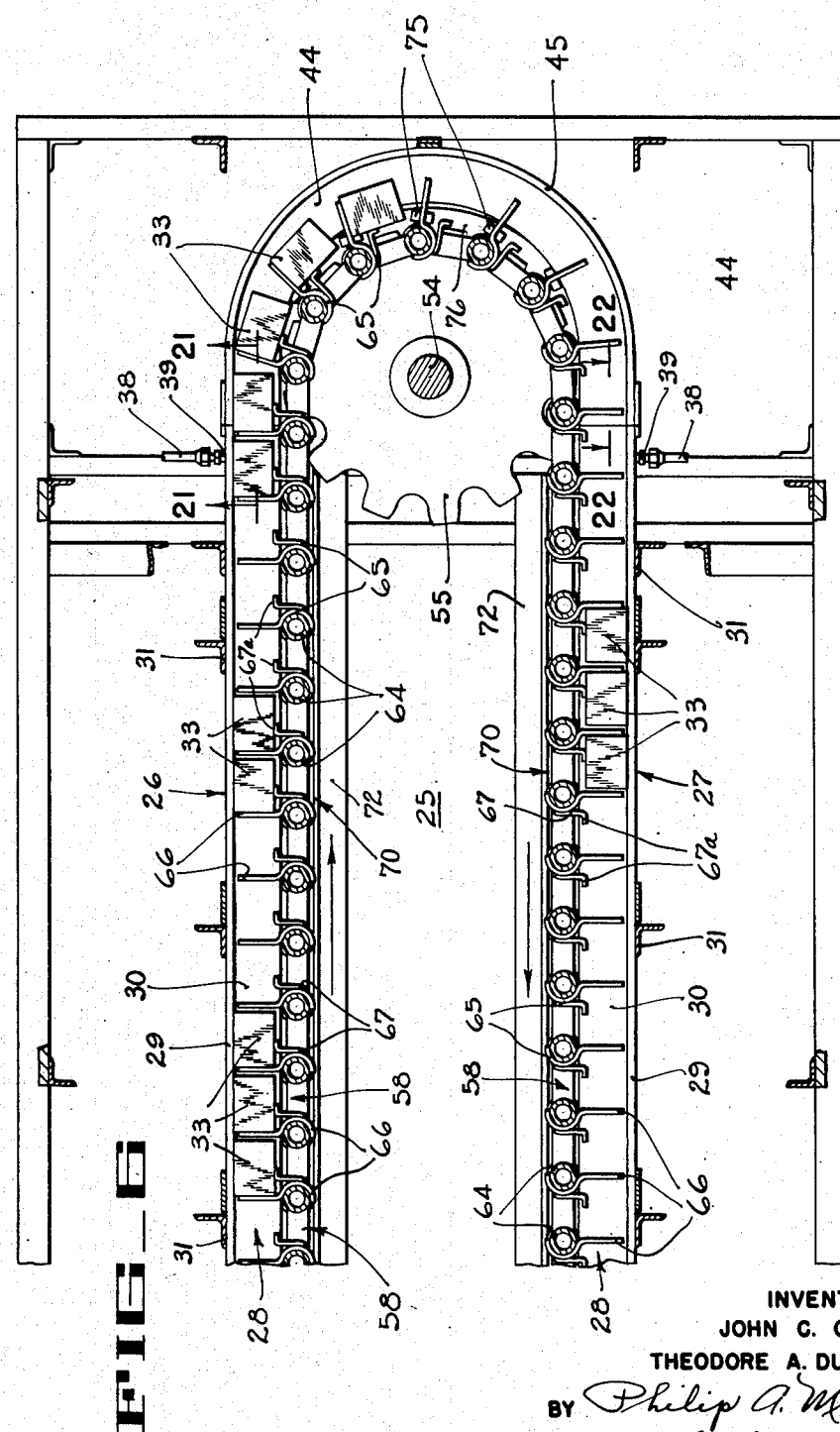

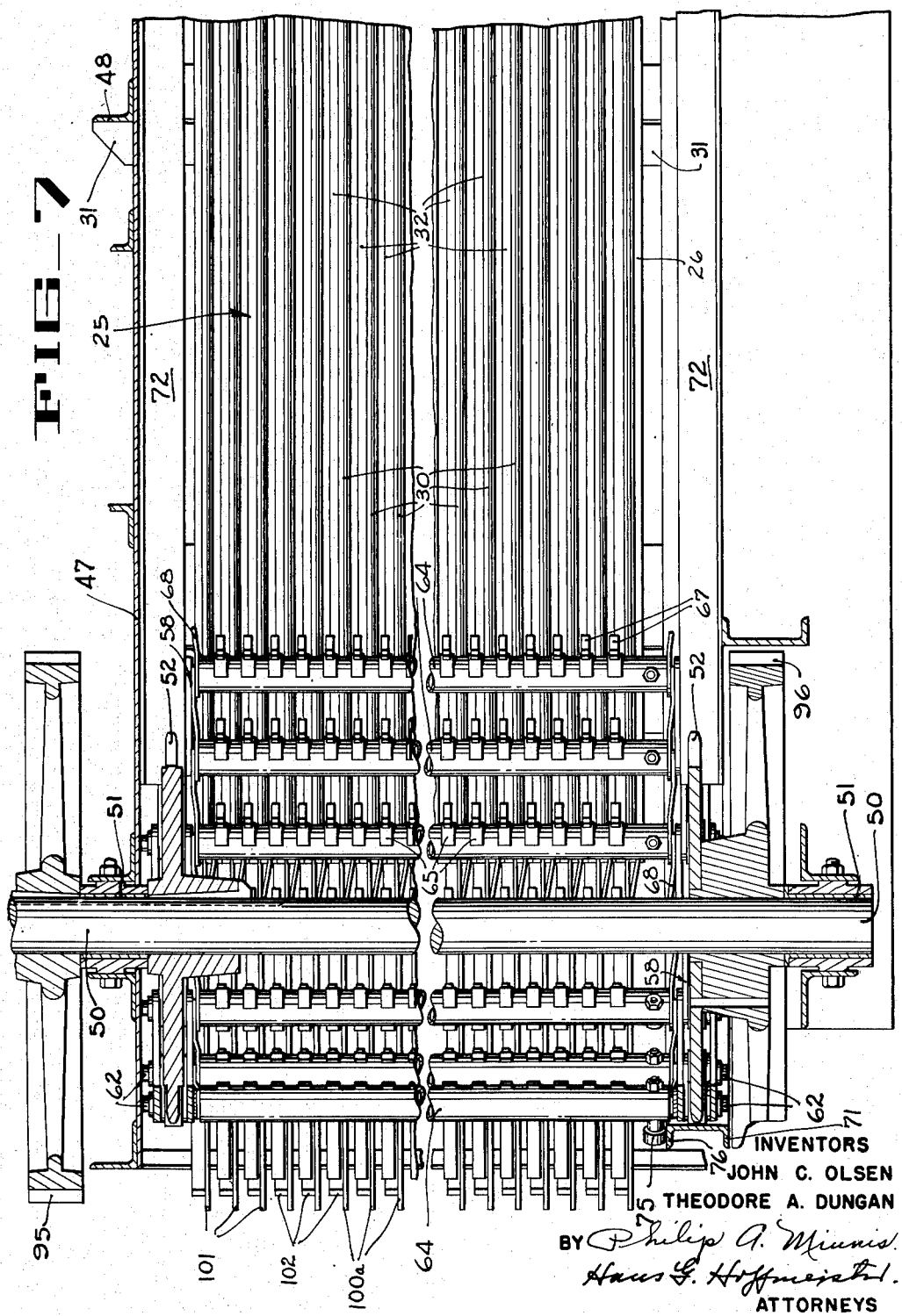

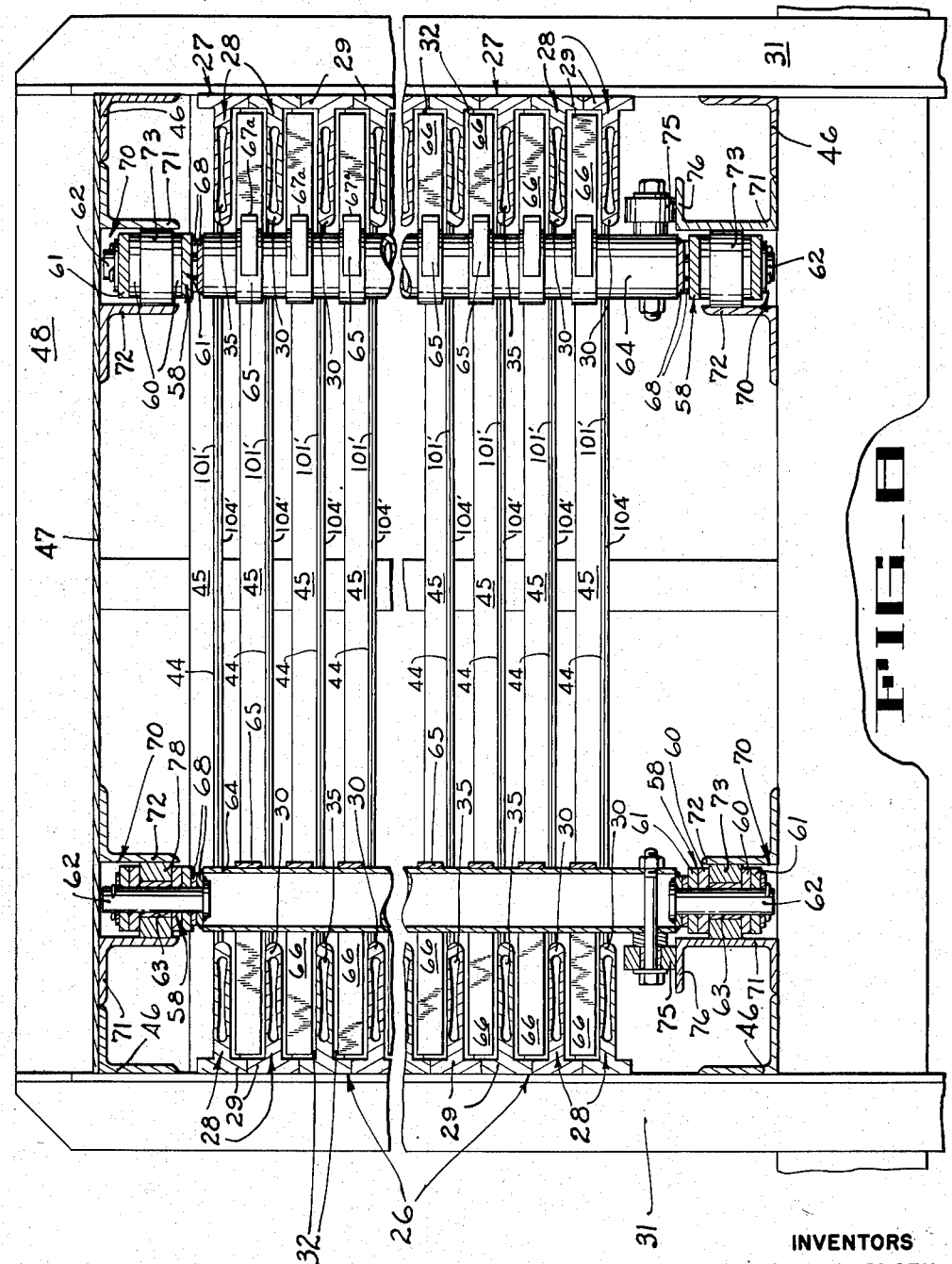

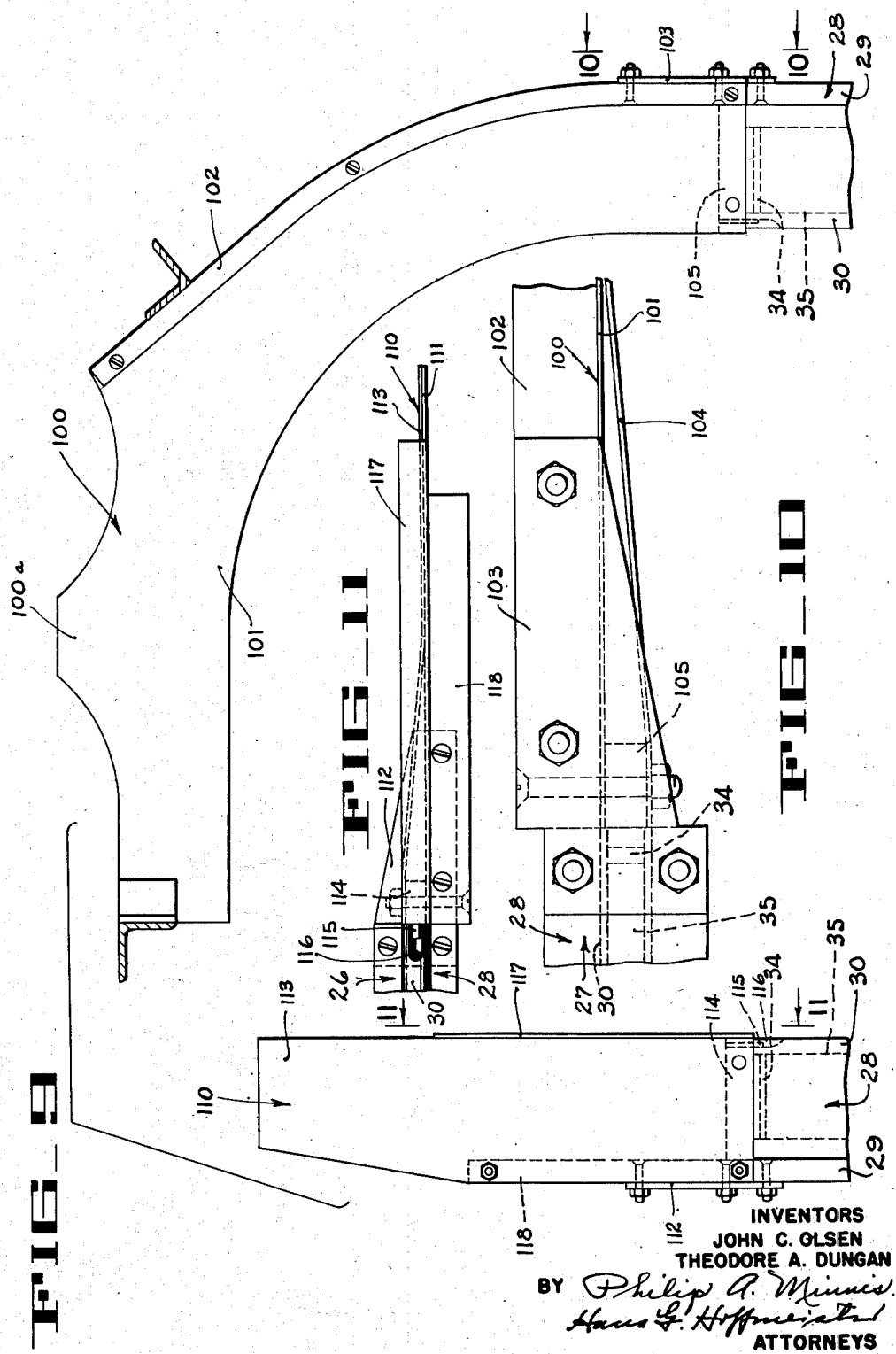

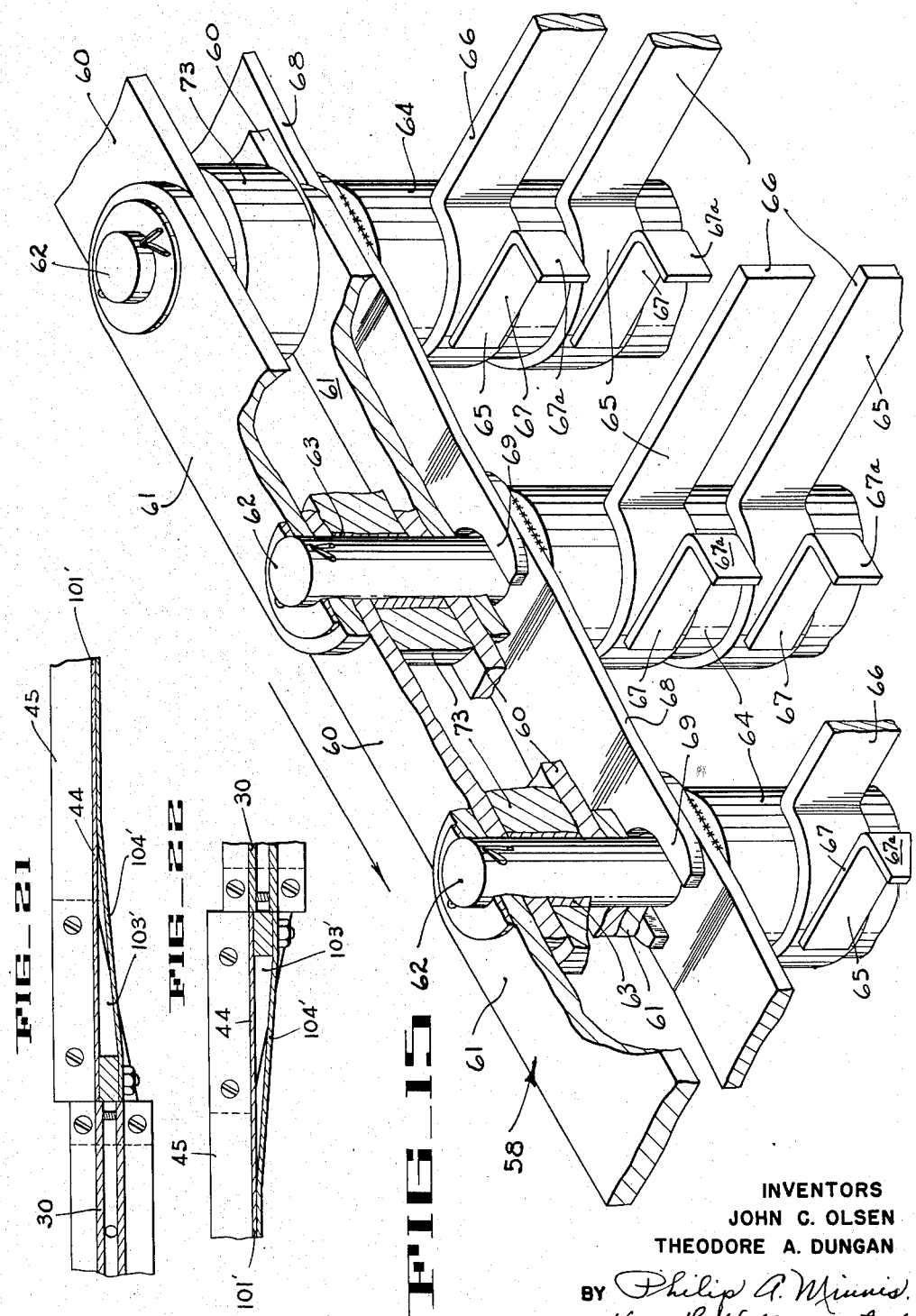

Feb. 24, 1953    J. C. OLSEN ET AL    2,629,233
FOOD FREEZING APPARATUS
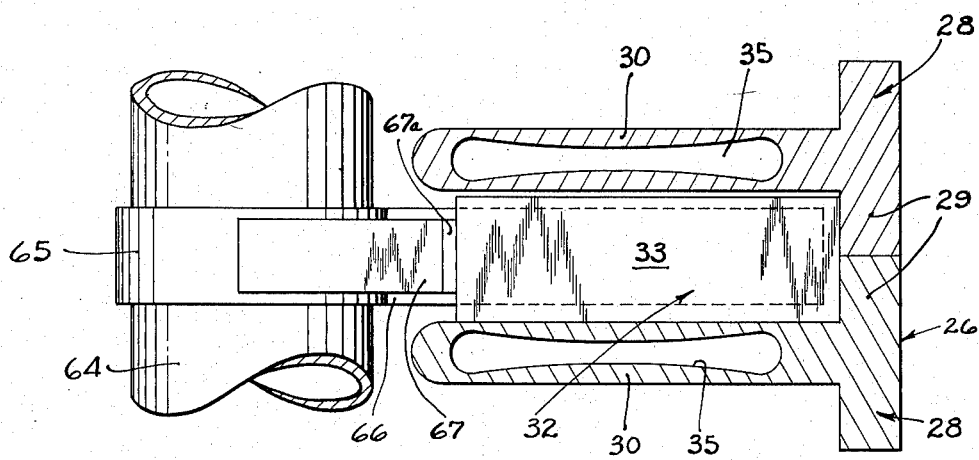
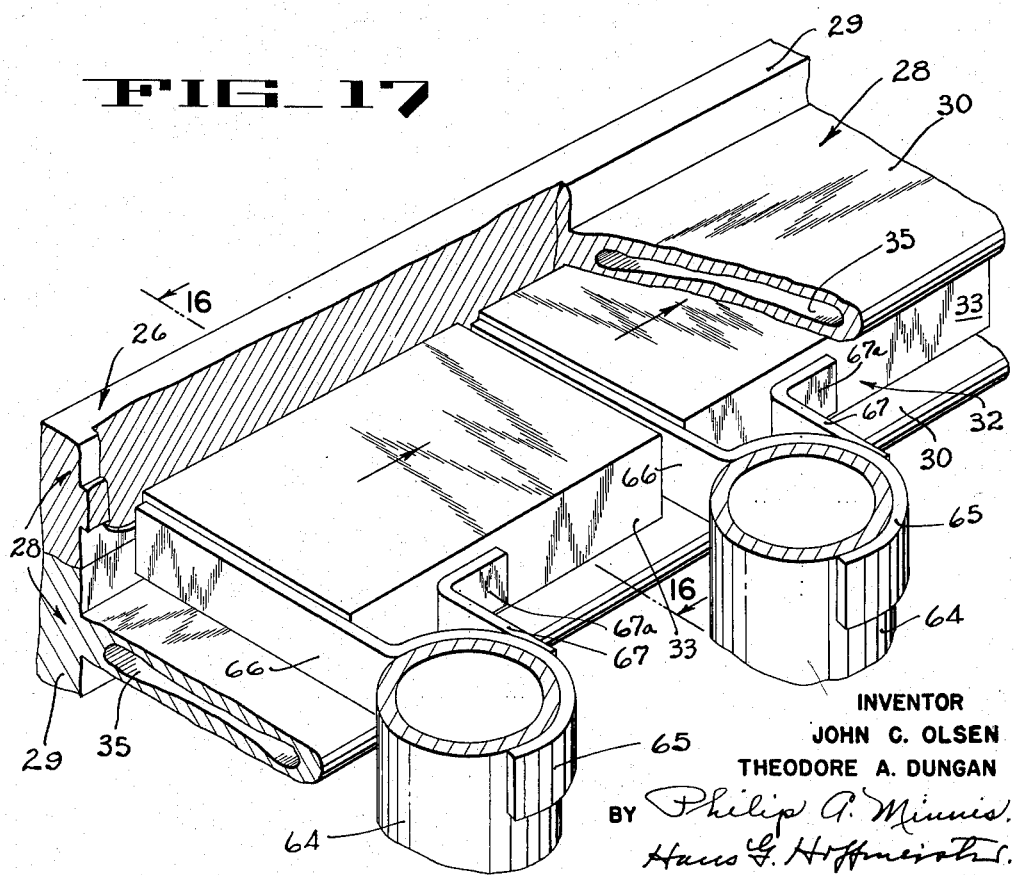
INVENTOR
JOHN C. OLSEN
THEODORE A. DUNGAN

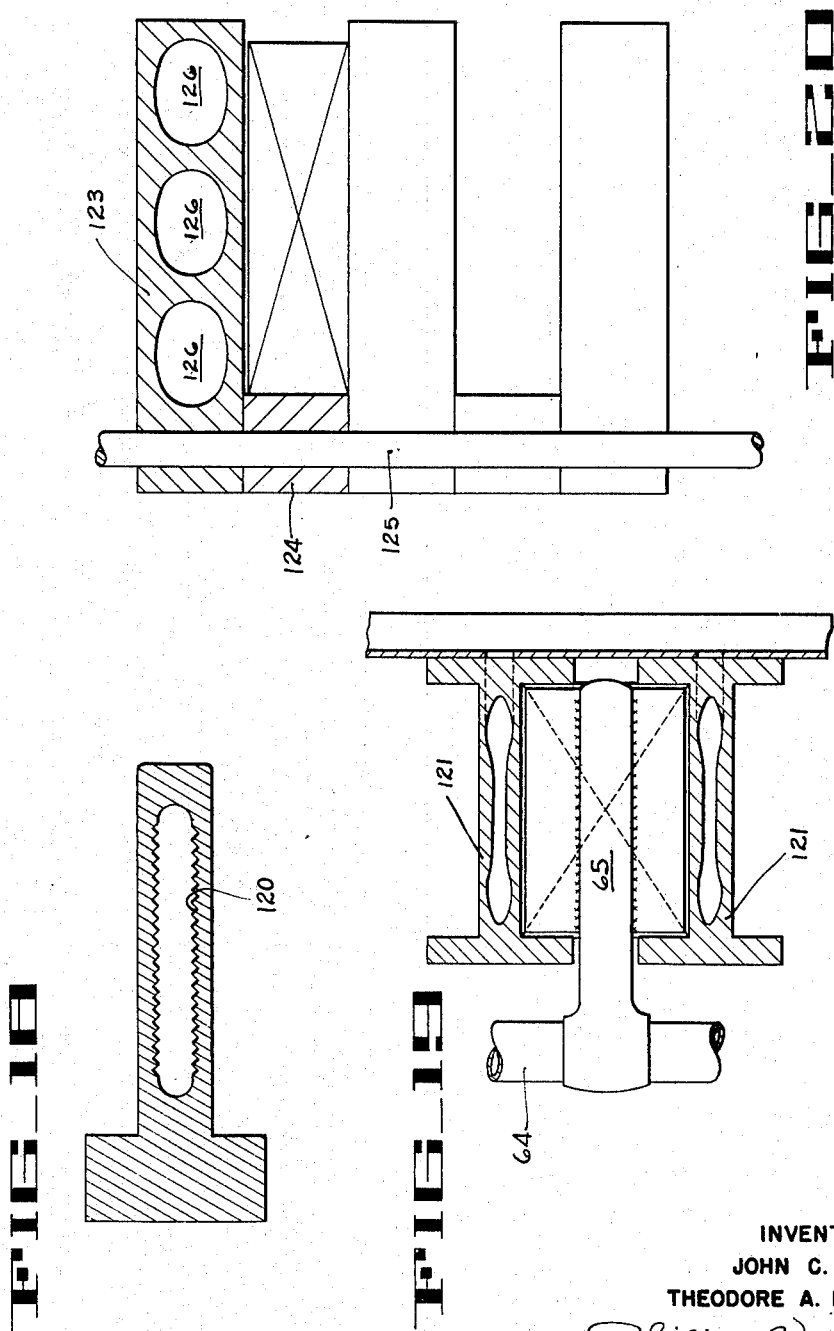

Patented Feb. 24, 1953

2,629,233

UNITED STATES PATENT OFFICE 2,629,233

FOOD FREEZING APPARATUS

John C. Olsen, Campbell, and Theodore A. Dungan, Los Altos, Calif., assignors to Food Machinery and Chemical Corporation, a corporation of Delaware Application February 24, 1948, Serial No. 10,286

12 Claims. (Cl. 62—114)

This invention relates to an apparatus for chilling or freezing perishable commodities such as vegetables, fish, meats, fruit, ice cream, and the like. It relates particularly to an apparatus for freezing such commodities in packages of fiber board, metal foil, impregnated paper, etc.

It is an object of the present invention to provide a food chilling or freezing apparatus adapted for effectively handling large quantities of packaged food in a continuous operation.

Another object is to furnish an apparatus of the type referred to, which is capable of thoroughly chilling or freezing packaged food in a minimum of time.

Another object of this invention is to provide an apparatus for freezing a substantial portion of the water content of packaged food in an automatic and continuous manner with a high degree of thermal efficiency.

Another object is to provide an effective food freezing apparatus which, while capable of handling large quantities of packaged food in a continuous operation, is of a comparatively small size.

Another object is to provide a freezing apparatus of the refrigerated contact surface type wherein the packages are in sliding relationship with the heat conducting surfaces.

A further object is to furnish a freezing apparatus, of the type comprising a freezing tunnel and means for passing packages of food therethrough, which is so arranged that as many surfaces of said packages as is practicable are in direct sliding contact with refrigerating surfaces of said tunnel.

Another object is to so arrange an apparatus, of the type referred to, that the mechanism for advancing said packages through said refrigerating chamber does not carry any heat into said chamber.

A further object is to provide mechanism for dependably and positively advancing packages of food in sliding contact with the refrigerating surfaces of apparatus of the type referred to whether the path formed by said refrigerating surfaces is linear or curved.

Another object is to provide members having channels for the flow of a cooling medium in their interior thereof and adapted to be assembled into a refrigerating tunnel or chamber of the type referred to.

Another object is to provide members of the type referred to which, while of a sturdy and rugged structure, are constructed to effectively transmit heat from their surface areas to whatever cooling medium may circulate in their interior.

These and other objects and advantages of the present invention will become apparent from the following description of the accompanying drawings, in which:

Fig. 1 is a fragmentary plan view of a portion of the freezing apparatus of the present invention.

Fig. 2 is a fragmentary plan view forming the continuations of Fig. 1 and showing the remainder of the apparatus.

Fig. 3 is a fragmentary side elevation of the portion of the apparatus shown in Fig. 1, certain parts being broken away.

Fig. 4 is a fragmentary side elevation of the portion of the apparatus shown in Fig. 2, certain parts being broken away.

Fig. 5 is a horizontal section taken along line 5—5 of Fig. 3.

Fig. 6 is a horizontal section taken along line 6—6 of Fig. 4.

Fig. 7 is a longitudinal vertical section through a portion of the apparatus taken along line 7—7 of Fig. 1, certain parts being broken away.

Fig. 8 is a vertical cross section of a portion of Fig. 5 taken along line 8—8 thereof, certain parts being eliminated.

Fig. 9 is an enlarged fragmentary plan view showing a feed ramp and a discharge ramp of the apparatus of the present invention.

Fig. 10 is a fragmentary side elevation of the feed ramp, shown in Fig. 9, viewed in the direction of the arrows 10—10 thereof.

Fig. 11 is a fragmentary side elevation of the discharge ramp, shown in Fig. 9, viewed in the direction of the arrows 11—11 thereof.

Fig. 12 is a fragmentary perspective of the feed ramp shown in Fig. 9.

Fig. 13 is a cross section through a refrigerating shelf at a point where the refrigerating medium is supplied to the interior thereof.

Fig. 14 is a fragmentary horizontal section through a refrigerating shelf at the point where the refrigerating medium is withdrawn therefrom.

Fig. 15 is a fragmentary perspective of part of the package-propelling mechanism.

Fig. 16 is a cross sectional view of two superposed refrigerating shelves with a food package traveling between them and an arm of the package propelling mechanism operatively engaging said package.

Fig. 17 is a fragmentary perspective of two superposed shelves with two successive food packages traveling between them, each being operatively engaged by an arm of the package propelling mechanism.

Figs. 18, 19, and 20 are cross sectional views illustrating modified forms of refrigerating shelves constructed in accordance with our invention.

Fig. 21 is an enlarged section of a portion of Fig. 6 taken along line 21—21 thereof.

Fig. 22 is an enlarged section of a portion of Fig. 6 taken along line 22—22 thereof.

The refrigerating apparatus (Figs. 1 and 2) of the present invention comprises a freezing tunnel or chamber 25, the two side walls 26 and 27 of which are formed by stacks of superposed shelf members 28 (Figs. 3 to 8). Each of said members 28 (Figs. 16 and 17) has a base portion in the form of a relatively narrow longitudinal strip or bar 29 and a horizontal shelf 30 projecting inwardly from said base portion, as best shown in Fig. 8.

The bars 29 are placed vertically one above another and are rigidly held in position by a number of uprights in the form of angle bars 31 to which they are secured in any suitable manner. The vertical height of the bars 29 is preferably such that, when they are joined together in the described manner, their respective shelves are spaced appropriate distances apart vertically to form compartments 32 which snugly accommodate a food package 33 as shown in Fig. 17.

The inwardly projecting shelves 30 of the superposed members 28 are hollow with their ends closed off by suitable cross walls 34, as shown in Figs. 9 and 14, to form a plurality of superposed parallel channels 35 for the flow of a cooling medium. To circulate the cooling medium through the channels 35 during operation of the apparatus, the right hand end of the refrigerating chamber 25 (Figs. 2 and 4) is flanked by a pair of horizontally positioned inlet manifolds 37 which are suitably supported from the chamber 25 a certain distance above the top surface thereof. From the manifolds 37 the refrigerating medium is distributed to the individual channels 35 through a multitude of branch pipes 38 (Fig. 4) which may be arranged in pairs, with the pipes of each pair branching off at diametrically opposite points of a manifold (Fig. 2), and which are connected to inlet ports 39 provided in the right hand ends of the shelf members 28 (Figs. 4 and 13). Near the left hand end of the shelf members 28 the channels 35 are provided with outlet ports 40 (Figs. 3 and 14) which are connected to pipes 41 that lead to vertically positioned outlet manifolds 42 disposed at either side of the refrigerating chamber 25 near the left hand end thereof as shown in Figs. 3 and 5.

The manner in which the pipes 38 and 41 may be fitted to the inlet and outlet ports 39 and 40, respectively, is illustrated in detail in Figs. 13 and 14. It will be understood, however, that the proper connections may be made in any suitable manner, and the pipes may even be welded directly to their respective ports, if desired.

At one end of the freezing chamber 25 the shelves 30 projecting from opposite side walls at identical levels are connected by arcuate plates 44, having outer rims 45, so that the upper surfaces of each two shelves 30 of identical level are united into an uninterrupted path in the form of a U as shown in Figs. 6, 21 and 22.

To impart sturdiness to the described structure longitudinal angle bars 46 (Fig. 8) may be arranged at the top and at the bottom of the refrigerating chamber, with their vertical flanges rigidly attached to the top or bottom ends, respectively, of the previously mentioned uprights 31. A rigid cover plate 47 (Figs. 1, 2, 7, and 8) may be mounted across the horizontal flanges of the upper angle bars 46 and may be reinforced by a number of cross braces in the form of transverse angle bars 48, as shown. A door 49 should be provided in the cover plate 47 to permit access to the interior of the refrigerating chamber 25 for the purpose of inspection and lubrication.

A shaft 50 (Figs. 5 and 7) extends vertically through the chamber 25 near the open end thereof and is suitably journaled in bearings 51 arranged on top and at the bottom of the described structure. Firmly mounted upon shaft 50 for rotation therewith is a pair of sprocket wheels 52 located near the ceiling and the bottom of the chamber 25, respectively, each having a diameter slightly less than the transverse width of the refrigerating chamber. Another shaft 54 (Fig. 6) extends vertically through the chamber 25 substantially coincident with the center axis of the arcuate plates 44 at the closed end of the chamber and carries another pair of sprocket wheels 55, only one of which is shown in Fig. 6, similar in size and arrangement to the sprocket wheels 52 on vertical shaft 50.

Trained around the sprocket wheels 52 and 55 at the opposite ends of the freezing chamber 25 is a pair of vertically spaced endless sprocket chains 58. Each of these sprocket chains (Fig. 15) is composed of alternating pairs of inner and outer links 60 and 61, the overlapping ends of which are pivotally connected by studs 62, and which are maintained in vertically spaced relation by spacer bushings 63 arranged around said pivot studs 62.

Vertical rods 64 (Figs. 5, 6, 8, and 15 to 17) of preferably tubular construction and of a length corresponding to the total vertical height of the superposed shelf members 28 connect each two aligned pivot studs 62 of the upper and lower sprocket chains 58, as shown in Figs. 7 and 8. These rods carry rigidly attached to their outer cylindrical surfaces as many vertically spaced conveyor arms 65 as there are refrigerating compartments 32 formed between the superposed shelves 30. Each of these conveyor arms comprises a pusher finger 66, extending radially from its supporting rod 64 into one of the compartments 32, and a retainer thumb 67 disposed somewhat ahead of its associated pusher finger in the direction of movement of the described conveyor mechanism. Each retainer thumb 67 terminates into a lug 67a extending parallel to, and intermediately of, the edges of the shelves 30 which form the compartment into which its associated pusher finger 66 protrudes.

To maintain the conveyor arms 65 at all times in their proper operating positions in which they protrude transversely across the refrigerating shelves of the freezing chamber 25 substantially at right angles, whether or not they carry a load and no matter whether they travel along linear or arcuate stretches of the shelves 30, each of the vertical conveyor rods 64 possesses two torque arms 68 which are welded to the top and bottom ends thereof, respectively. Each of these arms is arranged to extend in the direction of movement of the described conveyor arrangement and terminates into a fork 69 which embraces the pivot stud 62 of the directly preceding conveyor rod with two substantially parallel prongs as may best be seen from Fig. 15.

Due to these arms 68, the rotational position of each rod 64 relative to its center axis, and hence of the conveyor arms 66 projecting radially therefrom, is determined by the location of the directly preceding rod 64 and does not change as long as both rods move lineally in the same direction. However, as soon as the leading rod departs from said common lineal path, as it does whenever the conveyor belt travels around a sprocket wheel, it swings the forward end of the control arm 68 of the directly succeeding rod into the direction of its departure, and thus rotates the latter in the same direction around its center axis.

Having specific reference to Fig. 15, the second tubular rod 64 will be unable to rotate around its center axis, as long as the directly preceding rod 64 advances in the common lineal direction indicated by the arrow, due to the fact that the pivot 62 of the leading rod positively holds the control arm 68 of the second rod in the illustrated position. However, as soon as the leading rod is engaged by a sprocket and departs from its linear path in clockwise direction (Fig. 5), its pivot 62 swings the control arm 68 of the second rod in the same direction and thus rotates the latter around its center axis. In consequence thereof, the conveyor arms 65 projecting from the second conveyor rod are progressively advanced in clockwise direction no matter how heavy their load may be reaching its extreme forward position when the two rods under observation have reached locations in which the control arm of the second forms a perfect chord of the semi-circle described by the conveyor rods 64 as they travel around a sprocket. It will remain in this extreme position until the leading rod has negotiated the sprocket and resumes lineal movement along the opposite side of the freezing chamber, from which point onwards the above described operations occur in reverse; that is, the control or torque arm 68 of the second rod and the rod 64 itself are gradually swung in counterclockwise direction relative to its center axis until said second rod has reached the lineal run of the conveyor. From this point on, both the rods under observation advance in longitudinally aligned relation with their conveyor arms 65 projecting laterally across the adjacent refrigerating shelves 30 at right angles to the direction of movement of the conveyor run.

As may be seen from Fig. 7, each two consecutive rods 64 of the conveyor mechanism are interlinked, at both their extremities, by torque or control arms 68 in the described manner with the forked forward ends of said control arms staggered over the back ends of the directly preceding control arms in a fashion best shown in Fig. 15. As a result of this arrangement all the conveyor arms 65 projecting from the conveyor rods 64 are automatically and positively adjusted to their proper operating positions as they travel along the interior of the described refrigerating chamber 25.

Lest the torque exerted upon a rod 64 by the stack of packages engaged by its conveyor arms 65 may cause its control arms 68 to lever the directly preceding rod 64 laterally out of alignment with the conveyor run, the top and bottom ends of the conveyor rods are arranged to run in tracks 70 extending longitudinally from sprocket wheel to sprocket wheel as shown in Figs. 5, 6, and 8. Each of these tracks is formed by a pair of angle bars 71 and 72 which are composed of horizontal and vertical flanges with the latter arranged in spaced parallel relation to form guide channels and the former rigidly secured to the ceiling or the bottom of the freezing chamber as the case may be. The pivot studs 62 mounted upon the ends of the rods 64 protrude into these channels and rotatably mounted upon the previously mentioned spacer bushings 63 are guide rollers 73 of sufficient diameter to project radially beyond the chain links and engage the channel walls.

Thus, during their travel along the extended longitudinal runs of the described conveyor mechanism, the rods 64 are positively constrained to linear movement and are unable to yield laterally under the pressure that may be exerted upon them by the control arms 68 of the rods following directly behind. The conveyor arms 65 are, therefore, unable to yield from their predetermined operating positions, no matter how great their load may be.

To support the weight of the conveyor mechanism and thus facilitate its operation, suitable rollers 75 (Figs. 7 and 8) are pivoted to the lower ends of the conveyor rods 64, and arranged to travel on horizontal rims 76 projecting outwardly from the vertical flanges of the angle bars 71 which form the outer walls of the guide tracks 70. These angle bars 71 may be arcuately extended around, and joined behind, both of the lower sprocket wheels to form a single endless rail for the rollers 75 to travel upon, as shown in Figs. 5, 6, and 7.

An electric motor 80, mounted on top of the freezing chamber 25, as shown in Figs. 1 and 3, may be employed to drive the described conveyor mechanism. A hydraulic coupling 81 and variable speed drive 81a are provided through which the motor 80 drives a pulley 82 which in turn is operatively connected through a drive belt 83 with another pulley 84 keyed upon the input shaft of a speed reducer unit 85. This speed reducer unit has an output sprocket 86 which is driven at a greatly reduced speed, for instance, at one-tenth of the speed applied to the input shaft of the unit. The sprocket 86 is operatively connected through a sprocket chain 87 with another sprocket 88 keyed upon a transverse shaft 89 which is coupled to the input shaft of another speed reducer unit 90 that may be of the type adapted to turn its output gear 91 at one-sixtieth of the speed applied to its input shaft. The output sprocket 91 of the speed reducer unit 90 is arranged to mesh with a horizontal gear 92 of a relatively large diameter which is keyed upon a vertical shaft 93. Likewise, keyed upon this vertical shaft, a short distance below said larger gear 92, is a small gear 94 which meshes with another gear 95 of a much larger diameter, and this last mentioned gear is keyed upon the drive shaft 50 of the conveyor mechanism, as shown in Fig. 7.

The described train of gears delivers the power of the electric motor at a properly reduced speed to the drive shaft 50 of the conveyor mechanism so as to drive the latter at a very slow rate and with the necessary amount of force enabling it to push a very considerable number of food packages simultaneously through the many compartments 32 of the freezing chamber 25. To more evenly apply the force of the motor to the main drive shaft 50 of the conveyor mechanism, a second train of intermediate gears (not shown) may be provided to drive a gear 96 keyed upon shaft 50 near its lower end as shown in Fig. 7.

To facilitate delivery of the food packages into position between the conveyor arms 65 for transportation into and through the freezing compartments 32, the input end of each freezing compartment (Figs. 5, 7, and 9) is provided with a feed ramp 100. Each of these ramps comprises a horizontal plate 101 extending arcuately across most of the open front end of the refrigerating chamber. A guide rim 102 is provided along the latter part of the outer circumference of plate 101, as shown in Figs. 9 and 10, and an exteriorly arranged brace plate 103 may be employed to rigidly secure each ramp to its corresponding shelf member 28 with its upper surface positioned flush with the upper surface of its associated shelf 30, as best shown in Fig. 12.

Evidently the height of the feed spaces formed between each two superposed feed ramps 100 is greater than the height of the refrigerating compartments proper, because the latter are separated from one another by the substantial thickness of the refrigerating shelves 30 while the former are separated from one another by the thickness of the sheetlike ramp plates 101 only. To insure that the packages delivered into the feed spaces are smoothly and dependably guided into the narrower freezing compartments, the ceilings of the feed slots are, therefore, arranged to slope gently downward toward the input ends of the refrigerating compartments, causing the feed spaces to taper gently down to the exact size of said compartments.

For this purpose another arcuate plate 104 (Figs. 7, 10, and 12) is arranged directly below each ramp plate 101 with its initial portion in flat contact with the underside of the ramp plate 101 and its remaining portion bent downwardly to diverge gradually from the ramp plate 101 until it is flush with the lower surface of the shelf to which it pertains. To maintain the diverging ends of plates 101 and 104 in properly spaced relation, a spacer block 105 may be provided to which both plates may be bolted in any suitable manner as shown in Figs. 10 and 12. Additionally, the spacer block may be equipped with a number of centering studs 106 (Fig. 12) adapted to engage recesses or apertures 107 provided in the adjacent end of its associated shelf, to maintain the ramp in precisely the right position relative to the refrigerating shelf.

Thus, packages placed upon the feed ramps 100 at 100a and introduced between the conveyor arms 65 are engaged thereby and dependably and smoothly guided into the entrance of the freezing compartments 32 and are then pushed along the U-shaped path formed by said compartments.

To avoid jamming of the packages as they are swung around from one side of the freezing chamber to the other side thereof at the closed end of said chamber, especially if the transverse width of the chamber should be small, it may be of advantage to somewhat increase the vertical height of the compartment 32 at this particular point. To this end the previously described arcuate plates 44 (Figs. 6, 21, and 22) may be of the same sheet-like thickness as the plates 101 of the feed ramps 100, as shown at 101' to raise the ceiling of the passages by a distance equal to the difference between the thickness of a shelf 30 and a plate 44. Sloping plates 104' similar to the sloping plates 104 of the feed ramps 100 may be provided above each of these arcuate plates 44 at either one of their ends, so that the vertical width of the compartment may expand gradually as the packages move onto and around the arcuate plate 44 and may gradually return to its original size at the other end of said arcuate plate as the packages move again into the narrower confines of the freezing passage 32 on the other side of the chamber 25.

The output ends of the refrigerating compartments 32 are each provided with a discharge ramp 110 (Figs. 3, 5, 9 and 11) which comprises a horizontal plate 111, bolted to its associated shelf member 28 in any suitable manner such as by means of an exteriorly located brace plate 112, with its lower face disposed flush with the lower surface of the shelf 30, as shown in Fig. 11. A second plate 113 is arranged directly above plate 111 and slopes gently from the level of the upper surface of shelf 30 into flat contact with the upper face of the plate 111. In the described arrangement, therefore, the upper face of the downwardly sloping plate 113 constitutes the floor of the discharge space while the lower face of plate 111 constitutes the ceiling thereof.

Like the feed ramp 100, the discharge ramp 110 (Fig. 11) may be provided with a spacer block 114 to maintain the diverging ends of the plates 111 and 113 in proper position relative to each other and relative to the end of the shelf 30. The block 114 may also be provided with a number of centering studs 115 adapted to engage corresponding apertures or recesses 116 in the end of the shelf 30, as shown in Fig. 11.

In order that the frozen packages may travel along the discharge ramp, as they emerge from a freezing compartment, and will not be laterally pushed over the inner edges of the ramps 110 by the action of the conveyor arms 65, as they depart from linear advance to swing around the sprockets 52, each lower plate 111 of the discharge ramps is provided with an upwardly directed inner guide flange 117, as shown in Figs. 9 and 11. An outer guide may also be provided in the form of a bar 118 arranged at the ceiling of the discharge space as likewise shown in Figs. 9 and 11.

In practical operation the described apparatus is enveloped in a cover of a suitable insulating material (not shown) or is placed in its entirety into an insulated operating room which is preferably held at a temperature below 32° F. It is then connected to a refrigeration circuit which feeds a suitable cooling fluid, preferably a primary refrigerant, into the inlet manifolds 37 from where it is distributed through the branch pipes 38 and the inlet ports 39 into the many superposed refrigerating channels 35 formed by, and extending within, the described shelf units 28. Here the refrigerant evaporates and absorbs heat from the shelf units and anything in contact therewith such as the surrounding air or articles placed thereon. As a result thereof, the structure of the freezing chamber and its interior are rapidly cooled to low temperatures determined by the nature of the selected refrigerant.

The evaporated refrigerant, with all the heat which it absorbed from its environment, is drained from the channels 35 through the outlet ports 40 which are of materially larger size than the inlet ports 39, as may be seen by a comparison of Figs. 13 and 14, to allow for the increase in volume which accompanies evaporation. The outlet pipes 41 and the outlet manifolds 42 may then carry the spent refrigerant to a conventional condensing system (not shown) to be reconditioned for renewed use.

Any conventional refrigerating system may be employed in connection with the refrigerating apparatus of the present invention. It is preferred, however, to design the refrigerating system in such a manner as to always maintain a flow of no evaporated excess refrigerant through the channels of the shelves and to recirculate such excess refrigerant by mechanical and thermal pumps in such a manner that the condensing system is not endangered due to possible slop-over of unevaporated liquid. It should here be noted that while the specific embodiment of the invention as previously described and as illustrated in the accompanying drawing is especially adapted to operation with primary refrigerants such as ammonia, hydrocarbons, and the like, the various halogenated hydrocarbons. Secondary refrigerants such as brine, alcohol, etc., may equally well be employed in operating the apparatus of the invention.

As soon as the shelf units of the refrigerating chamber have been sufficiently cooled by the described circulation of the refrigerant, the motor 80 may be set in operation to turn the conveyor mechanism in clockwise direction as viewed in Fig. 5. Packages of food may now be fed at 100a into the spaces formed by the superposed feed ramps 109 where they will be successively engaged by the pusher fingers 66 of the conveyor arms 65. These pusher fingers slide the packages along the arcuate feed ramps 100, with the outer guide rims 102 and the gradually descending ceilings 104 conducting them safely into the narrow freezing compartments 32. As previously pointed out, the dimensions of the packages should be so chosen that they fit snugly into the freezing compartments, so as to establish intimate thermal contact between the top and bottom surfaces of each package and the top and bottom walls of the refrigerating compartment as shown in Fig. 17. At the same time, the retainer thumbs of the conveyor arms 65 urge the packages with their outer side walls against the side walls of the compartments so that as many areas of the packages as possible are in intimate contact with refrigerated metal surfaces that will rapidly absorb heat from said packages and transmit it to the refrigerant circulating in the interior of the shelf units 28.

To enable the refrigerant circulating within the channels 35 to effectively absorb a maximum amount of heat from articles in contact with the shelves 23, it is essential that the shelf members be made from a material which is a good conductor of heat. At the same time, however, the shelves must be of a rugged construction and must be able to withstand considerable external abuse and heavy internal pressures without deformation or cracking. We have found that shelves made from extruded aluminum, or aluminum alloys, are highly satisfactory in that they combine excellent heat conducting qualities with great mechanical strength. It will be understood, however, that very gratifying results may also be obtained with shelf units made of other suitable heat conducting materials.

The cross-section of the refrigerating shelf members is another important factor in the efficiency of the described apparatus. We have found that a shelf of the cross-section illustrated in Figs. 12, 13, and 16, wherein the contour of the channel 35 is that of a deflated hose, is highly effective, since it combines thin walls and a large contact surface between the refrigerant and the solid structure of the shelf with great mechanical strength and sturdiness. Still better results may be obtained with shelves of the cross-section illustrated in Fig. 18, wherein the walls of the channel 35 are recessed to form a multitude of longitudinal grooves or furrows 120, as shown, which materially increase the contact area between the refrigerant and solid structure of the shelf.

We have found that during their travel through the freezing compartments 32 the packages or cartons do not move on the metal surfaces of the shelf members directly, but actually slide on a very thin film of ice which forms over the outer surfaces of the shelves and which reduces the frictional resistance to a minimum, so that the fit between packages and freezing compartments may be made very tight without impeding the smooth progress of the packages; and even the usual increase in the volume of the packages, incident to the freezing of the water contained in the packaged products, will merely enhance the thermal contact between compartment and package without obstructing the normal advance of the package procession.

As an added advantage this thin glace of ice safeguards the packages against unsightly markings that may result from direct sliding contact of the cartons with surfaces of aluminum or aluminum alloys. Furthermore, as long as the apparatus of the invention is continuously supplied with packages, the above mentioned ice glace remains practically at uniform thickness over surprisingly long periods of time, instead of building up to an extent where it binds the cartons. As a result thereof, the refrigerating apparatus of the present invention need not be defrosted, or otherwise resurfaced, as frequently as the known refrigerators.

Moreover, the described arrangement of the many superposed freezing compartments in the form of an almost all-enclosing refrigerating chamber, having only a single vertical outlet zone in which both the input and the output ends of the individual compartments are located, limits entrance of heat and humidity into the freezing zone to a minimum and thus materially increases the efficiency of the device. In addition, this arrangement permits the conveyor mechanism to be completely confined within the freezing zone in the manner illustrated and described, so that the efficiency of said zone will not be impaired by the continuous passage of components that move during the greater part of their endless travel through a warmer outside atmosphere where they absorb heat which they transmit constantly to the freezing zone.

While we have explained our invention with the aid of a specific embodiment, it will be understood that we do not wish to be limited to the constructional details shown and described, which may be departed from without departing from the scope and spirit of the invention. Thus, the superposed freezing compartments need not be arranged in the oblong elliptic form illustrated in the accompanying drawings, but may be disposed in circular conformation and in fact any other shape or form adapted to enclose, and be serviced by, an endless conveyor mechanism.

The cross-sectional shape of the individual freezing compartments and of the shelf units from which the compartments are composed, may vary greatly. For instance, to increase the area over which the packages are in direct thermal contact with refrigerated metal surfaces, the compartments 32 may be formed as shown in Fig. 19, wherein the shelf units 121 have the profiles of H- or double-T-bars so that the inner wall of each compartment is partially closed with only sufficient space left for the conveyor arm 65 to reach into its interior.

Furthermore, the shelf members may be made in two separate parts as shown in Fig. 20 wherein part 123 is the shelf proper while part 124 is a spacer bar, both being provided with a vertical bore which is engaged by a common mounting rod 125. Such an arrangement permits the shelves 123 to be assembled into compartments of varying vertical width by using spacer bars 124 of different thickness. As also shown in Fig. 20, the shelves may accommodate a plurality of refrigeration channels 126 if desired. Finally, it will be understood that conveyor mechanism other than the one specifically described may be adapted for operation in the arrangement of our invention.

Having thus described our invention, what we claim as new and desire to protect by Letters Patent is:

1. Refrigerating apparatus comprising an enclosure having a plurality of inwardly directed horizontal shelves arranged to form a number of superposed compartments each having input and output apertures, said enclosure being of such conformation that said input and output apertures are located adjacent to one another, channels extending through said shelves for the flow of a cooling medium and having inlet and outlet ports, a number of manifolds disposed horizontally above said compartments, distributor pipes each leading from said inlet manifolds to one of said inlet ports, a number of outlet manifolds disposed vertically beside said enclosure, discharge pipes leading from said outlet ports to said outlet manifolds, feed ramps attached to said shelves at the input apertures of said compartments, discharge ramps attached to said shelves at the output apertures of said compartments, an endless conveyor belt extending around vertical axes and situated completely within said enclosure, horizontal rows of pusher arms supported from said belt in horizontal alignment with and extending radially into said compartments, means for turning said belt in a direction from said feed ramps to said discharge ramps, and means adapted to automatically set said arms at right angles relative to the inner edges of said shelves during operation of said belt.

2. Refrigerating apparatus comprising an enclosure having a plurality of inwardly directed horizontal shelves arranged to form a number of superposed compartments each having an input and an output aperture, channels extending through said shelves for the flow of a cooling medium and having input and outlet ports, a number of manifolds disposed horizontally above said compartments, distributor pipes each leading from said inlet manifolds to one of said inlet ports, a number of outlet manifolds disposed vertically beside said enclosure, discharge pipes leading from said outlet ports to said outlet manifolds, feed ramps attached to said shelves at the input apertures of said compartments, discharge ramps attached to said shelves at the output apertures of said compartments, an endless conveyor belt extending around vertical axes and situated completely within said enclosure, horizontal rows of pusher arms supported from said belt in horizontal alignment with and extending radially into said compartments, means for turning said belt in a direction from said feed ramps to said discharge ramps, and means adapted to automatically set said arms at right angles relative to the inner edges of said shelves during operation of said belt.

3. Arrangement according to claim 2 wherein said outlet ports are materially larger than said inlet ports.

4. A refrigerating apparatus comprising a chamber having two parallel side walls, a plurality of horizontal shelves projecting inwardly from said side walls and arranged to form a number of superposed compartments, and channels extending longitudinally within said shelves for the flow of a cooling medium and having inlet and outlet ports at opposite ends thereof, a pair of inlet manifolds disposed horizontally above said compartments at either side of said chamber, distributor pipes leading from said manifolds to said inlet ports, a pair of outlet manifolds disposed vertically at either side of said chamber, discharge pipes leading from said outlet ports to said outlet manifolds, a plurality of superposed arcuate shelf members arranged to connect horizontally aligned ones of the shelves projecting from opposite side walls to establish continuous passages, feed ramps attached to each of the free shelf ends of one of said side walls, discharge ramps attached to each of the free shelf ends of the opposite side wall, an endless conveyor belt extending around vertical axes and situated completely within said chamber, a number of horizontal rows of radially projecting pusher arms supported from said belt, said rows being horizontally aligned with said compartments, and means adapted to automatically set said pusher arms at right angles relative to the inner edges of said compartments during operation of said belt.

5. Arrangement according to claim 2 wherein said feed ramps extend arcuately across the greater part of the open end of said chamber.

6. Arrangement according to claim 2 wherein said feed ramps are of lesser vertical thickness than said shelves for the feed spaces formed between superposed feed ramps to be of greater vertical widths than said compartments, and including means for diminishing the vertical width of said feed spaces gradually to the width of said compartments.

7. Arrangement according to claim 2 wherein said discharge ramps are of lesser vertical thickness than said shelves for the discharge space formed between superposed discharge ramps to be of greater vertical width than said compartments.

8. Apparatus for refrigerating food packaged in cartons in a continuous process, including a chamber comprising two confronting walls, each composed of a plurality of superposed segments having inwardly projecting horizontal shelves, said shelves being arranged to form a number of superposed compartments of a vertical depth corresponding to the thickness of said cartons, channels extending longitudinally through said shelves for the flow of a cooling medium, a plurality of arcuate shelf members arranged to connect horizontally aligned ones of the shelves projecting from said confronting side walls at one end of said chamber to connect said compartments into continuous passages of horse-shoe form for the cartons to travel along, feed ramps attached to each of the free shelf ends of one of said walls and extending arcuately across the greater portion of the open end of said chamber, discharge ramps attached to each of the free shelf ends of the opposite side wall, and an endless conveyor belt situated completely within said chamber and extending around vertical axes and closely adjacent to the edges of said shelves for movement in a direction from said feed ramps to said discharge ramps, said belt comprising a pair of vertically spaced sprocket chains, each composed of a sequence of links and studs pivotally connecting adjacent ones of said links, vertical rods rigidly connecting vertically aligned ones of said studs, a plurality of vertically spaced conveyor arms firmly attached to each of said rods to form a number of vertically spaced horizontal rows corresponding to, and in horizontal alignment with respective ones of said compartments, and control members rigidly attached to each of said rods at either ends thereof, each having a free end in the form of a fork arranged to embrace the stud of the rod directly preceding its rod in the direction of movement of said belt.

9. Apparatus for refrigerating the contents of filled packages having a pair of flat opposite surfaces, said apparatus comprising a pair of compartmented side wall structures each having a plurality of straight, vertically superposed refrigerated shelf members extending toward the shelf members of the other wall structure, said shelf members having flat, substantially parallel opposite surfaces and being spaced apart by approximately the distance separating the flat sides of the packages to be frozen, guide means at one end of the enclosure formed by said side wall structures to connect corresponding shelf members thereof, thereby to form a plurality of inter-shelf compartments extending along both said side wall structures and adapted to receive the packages therein with the flat package surfaces in intimate contact with the shelf surfaces defining said compartments, an endless conveyor belt extending around vertical axes and situated within the enclosure formed by said compartmented side wall structures and said guide means, horizontal rows of pusher arms supported from said belt each of said rows being horizontally aligned with one of said compartments with its arms extending radially into the spaces formed between said superposed shelf members and said guide means, and means for turning said belt, said belt being arranged to automatically set said pusher arms at substantially right angles relative to the edges of said shelf members and said guide means during its movement, whereby the packages to be frozen are uniformly conveyed through said compartments with their flat opposite surfaces in intimate sliding contact with the flat surfaces of said shelf members.

10. Thermal transfer apparatus of the sliding contact type for handling packages having a pair of flat opposite sides, said apparatus comprising a heat transfer compartment arranged in a loop including rectilinear portions and having its side facing the interior of the loop open and having the other sides thereof arranged to slidingly contact substantial portions of the flat sides of the packages passing therethrough, said compartment having feed and discharge openings adjacent one another, means for controlling the temperatures of the package contacting sides of the compartment, and means within the interior of the loop and projecting into said compartment through said open side for advancing packages with both flat opposite sides thereof in intimate sliding contact with the compartment sides from said feed to said discharge opening.

11. Thermal transfer apparatus for the contents of filled packages each having a pair of flat opposite sides, said apparatus comprising an enclosure having a plurality of inwardly directed, superposed, thermally conductive shelves each having flat upper and lower package contacting surfaces, said shelves being spaced apart vertically to form a number of superposed compartments between adjacent shelves to receive the packages to be treated therebetween with the flat, opposite package sides in intimate contact with said flat compartment bounding surfaces, each compartment having a feed opening at one end, a discharge opening at the other end and an open flank and conveyor means disposed adjacent the open flanks of said compartments and protruding through said open flanks into the compartments for moving the packages along said compartments from the feed ends to the discharge ends thereof with the flat packages sides in intimate sliding contact with the flat bounding surfaces of said compartments, said conveyor means comprising members adapted to engage portions of the packages facing an open compartment flank to prevent lateral displacement of the packages.

12. Apparatus for refrigerating the contents of filled packages each having a pair of flat opposite sides, said apparatus comprising oppositely positioned first and second compartmented side wall structures each having a plurality of straight, vertically, superposed shelf members extending toward the shelf members of the opposite side wall structure, said shelf members having flat substantially parallel surfaces and being spaced apart to receive therebetween, and in intimate sliding contact therewith, the flat sides of the packages to be frozen, means for refrigerating said shelf members, transfer guide means of lesser thickness than said shelf members aligned with corresponding shelf members on opposite side wall structures for guiding the packages from the straight shelf members on the first side wall structure to the straight shelf members on the second side wall structure, and conveyor means having members thereof extending into the space between said shelf members and said guide means to engage packages therein and push said packages consecutively through the spaces between the shelf members of said first side wall structure, said transfer guide means and the shelf members of said second side wall structure.

JOHN C. OLSEN.
THEODORE A. DUNGAN.

REFERENCES CITED

The following references are of record in the file of this patent:

UNITED STATES PATENTS

| Number | Name | Date |
|---|---|---|
| 1,297,569 | Johnson | Mar. 18, 1919 |
| 1,814,915 | Grayson | July 14, 1931 |
| 1,898,758 | Bottoms | Feb. 21, 1933 |
| 1,913,001 | Ross | June 6, 1933 |
| 1,928,755 | Hall | Oct. 3, 1933 |
| 1,932,887 | Giger | Oct. 31, 1933 |
| 2,019,551 | Varney | Nov. 5, 1935 |
| 2,053,540 | Stoneman, Jr. | Sept. 8, 1936 |
| 2,228,998 | Birdseye | Jan. 14, 1941 |
| 2,263,499 | Huber | Nov. 18, 1941 |
| 2,436,390 | Kleist | Feb. 24, 1948 |
| 2,478,465 | Dodson | Aug. 9, 1949 |
| 2,511,661 | Allard | June 13, 1950 |